H. E. REEVE.
JOINT.
APPLICATION FILED APR. 22, 1907.

918,198.

Patented Apr. 13, 1909.

Witnesses
George W. Harper Jr
Stewart H. Jones

Inventor
Henry E. Reeve
By his Attorney

UNITED STATES PATENT OFFICE.

HENRY E. REEVE, OF NEW YORK, N. Y.

JOINT.

No. 918,198.　　　Specification of Letters Patent.　　　Patented April 13, 1909.

Application filed April 22, 1907. Serial No. 369,483.

*To all whom it may concern:*

Be it known that I, HENRY E. REEVE, a citizen of the United States, residing in the city of New York, borough of Brooklyn, county of Kings, State of New York, have invented certain new and useful Improvements in Joints, of which the following is a full, clear, and exact description.

My invention relates to joints and particularly of the universal type for use, for instance, on brackets etc.

The main object is to provide a joint which is efficient and capable of wide ranges of adjustment.

Another object is to provide a construction so simple that it may be economically manufactured.

The accompanying single sheet of drawings illustrates the preferred form and modifications thereof.

Broadly considered the invention consists in the combination of a relatively stationary member or support and a movable member formed of two parts, one of which is movable independently of the other.

Figure 3:
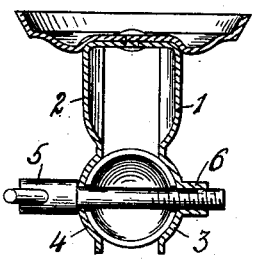
Figure 2:
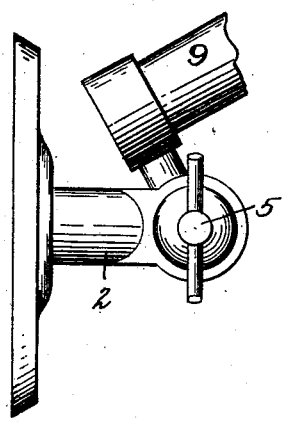
Figure 1:
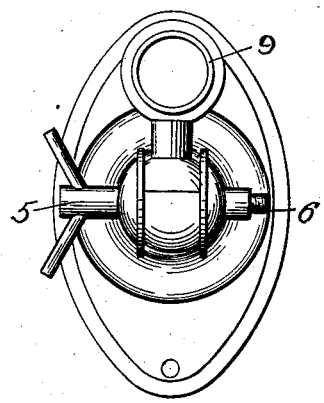
Figure 4:
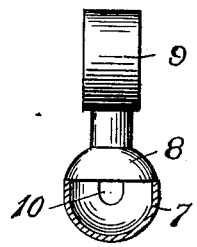
Figure 7:
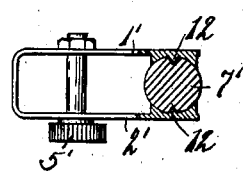
Figure 5:
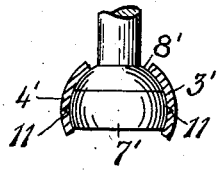
Figure 6:
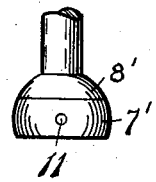

Figure 1 is a front view of a bracket joint embodying the preferred form of my invention. Fig. 2 is a side view of the same, one of the members of the joint being adjusted to a position slightly different from that of Fig. 1. Fig. 3 is a plan view and section of the same, part of the movable member of the joint being omitted. Fig. 4 is a view of the movable member detached from the supporting member and showing the parts separated for greater clearness. Fig. 5 is a detail front view and partial section of a modification. Fig. 6 is a side view of the movable member of the same. Fig. 7 is a plan view and section of another modification.

In the preferred form the invention contemplates a ball and socket arrangement which is artistic in appearance, efficient and easy to manufacture. It will be obvious, however, that the specific form is only one of many possible adaptations. The stationary part, so called, or support, in the preferred form, has two arms 1, and 2, terminating in cup like seats 3, and 4, which receive the movable member. A clamping member 5, in the form of a screw, takes into a threaded boss 6, for drawing the seats toward each other. For certain kinds of work the arms 1, and 2, may be formed of sufficiently strong spring material for clamping the movable member without the aid of the screw 5. The movable member of the joint consists preferably of a ball in two parts 7, and 8. The part 7, is somewhat larger than part 8, and may be termed the base. The arm 9, or other device, is carried by part 8. The base 7, may conveniently be hollow and made of sheet metal with notches such as 10, on opposite sides to allow for the clamp screw.

It will be obvious that the ball as a whole may rotate in the seats 3, and 4, about the screw 5, as an axis and that the part 8, of the ball may be rotated on an axis perpendicular to the plane of the upper edge of the base 7, the seats 3, and 4, acting as bearings. The resistance to rotation on these two axes is substantially proportional to the sizes of the base 7, and part 8, respectively. It is thus possible to practically fix the base 7, in position, it being larger, and still to permit rotation of the part 8, without changing the adjustment.

In the form shown in Figs. 5 and 6, the base 7', has pivots 11, 11, in the seats 3' and 4' while the part 8' is similar to part 8, in Fig. 4. The seats 3' and 4' may be drawn together by any suitable means.

In Fig. 7, the base 7' has recesses to receive the pivots 12, 12, which project inward from the sockets of the arms 1' and 2'. The arms are drawn together by a screw 5'.

The advantages of the invention and its wide range of utility will be appreciated by those acquainted with the art.

What I claim is:

1. A joint comprising ball and socket members and a clamping-bolt maintaining the parts in proper working position, said bolt forming an axis for the ball to turn upon, one part of said ball having movement independently of another part thereof.

2. A joint comprising ball and socket members and a clamping-bolt maintaining the parts in proper working position, said bolt forming an axis for the ball to turn upon, one part of said ball having rotary movement independently of another part thereof.

3. A joint comprising a socket member, a pivot, and a ball formed of several parts, located in said socket member for movement as a whole on said pivot in one direction, one part having movement independently of the other in another direction.

4. In a device of the character described, the combination of two members, one having a socket and the other a ball comprising several parts, and means for clamping said parts and socket together, such means being arranged to limit the movement of one of said parts except upon the clamping means as an axis, another of said parts being movable independent of the clamping means.

5. In a device of the character described, the combination of two members, one member comprising a pair of concaved jaws, a ball member comprising several parts, a clamping member passed through one of said ball parts and secured in said jaws, the ball as a whole turning on said clamping member, an arm radially secured to one of the ball parts, said latter part being rotatable in said jaws with relation to the ball part engaging the clamping member.

6. The combination of an arm, a clamping member composed of a pair of concaved jaws, a ball comprising a pair of spherical segments, one of such segments being secured to said arm, a clamping-bolt projecting through another of said segments and into the jaws, upon which bolt said segment turns as an axis, the ball-segment secured to the arm being rotatable independent of said other segment engaging the bolt.

7. A ball-and-socket joint comprising a socket member and a ball composed of several parts, and clamped in the socket by a bolt passing through one of said ball parts and into the socket member, the ball as a whole being rotatable upon said bolt as an axis, one of said ball parts not engaged by the bolt being movable independent of said part.

8. In a joint construction, a yielding socket having spring arms and a ball, a part of which is rotatable in the socket about two different axes, the resistance to rotation about one axis being greater than the resistance to rotation about the other axis.

9. In a joint, a yielding support, a two part member and a pivot for rotatably guiding said member, one part being rotatably held relative to the other by said support.

10. In a joint, a support having spaced arms, a clamping screw and a two-part movable member having a base part mounted on said screw and the other part mounted on the base.

11. A joint, consisting of a socket member, a split ball member held therein and a clamp screw passing through one part of said ball member and taking into said socket member.

HENRY E. REEVE.

Witnesses:
 FRANK T. REEVE,
 G. A. ANNABLE.